US009257859B2

(12) United States Patent
Nassar et al.

(10) Patent No.: US 9,257,859 B2
(45) Date of Patent: Feb. 9, 2016

(54) DYNAMIC BATTERY CONTROL BASED ON DEMAND

(71) Applicant: General Electric Company, Schenectady, NY (US)

(72) Inventors: Jason Alan Nassar, League City, TX (US); Randall John Kleen, Channelview, TX (US)

(73) Assignee: General Electric Company, Schenectady, NY (US)

( * ) Notice: Subject to any disclaimer, the term of this patent is extended or adjusted under 35 U.S.C. 154(b) by 425 days.

(21) Appl. No.: 13/712,663

(22) Filed: Dec. 12, 2012

(65) Prior Publication Data

US 2014/0159495 A1 Jun. 12, 2014

(51) Int. Cl.
*H02J 1/00* (2006.01)
*H02J 3/00* (2006.01)
*H02J 7/00* (2006.01)

(52) U.S. Cl.
CPC ............ *H02J 7/0068* (2013.01); *H02J 7/0024* (2013.01); *Y10T 307/653* (2015.04)

(58) Field of Classification Search
CPC .......................... H02J 7/0024; H02J 7/0068
USPC ................................ 307/43, 71; 320/117, 126
See application file for complete search history.

(56) References Cited

U.S. PATENT DOCUMENTS

| 5,825,100 | A | 10/1998 | Kim | |
|---|---|---|---|---|
| 6,268,711 | B1 * | 7/2001 | Bearfield | H02J 7/0024 320/116 |
| 7,688,046 | B2 | 3/2010 | Li et al. | |
| 2006/0092583 | A1 * | 5/2006 | Alahmad | H02J 7/0024 361/15 |
| 2008/0180061 | A1 * | 7/2008 | Koski | H01M 10/441 320/117 |
| 2010/0072947 | A1 * | 3/2010 | Chan | H02J 7/0016 320/134 |
| 2010/0261048 | A1 * | 10/2010 | Kim | H01M 10/44 429/150 |
| 2011/0181245 | A1 * | 7/2011 | Wey | H02J 7/0016 320/118 |
| 2013/0062952 | A1 * | 3/2013 | Park | H01M 10/4257 307/71 |

* cited by examiner

*Primary Examiner* — Rexford Barnie
*Assistant Examiner* — Rasem Mourad
(74) *Attorney, Agent, or Firm* — Fletcher Yoder, P.C.

(57) ABSTRACT

A system is provided that includes a plurality of power units each configured to supply power. Additionally, the system includes a plurality of contacts each configured to toggle an electrical connection of each of the plurality of power units as a network. Moreover, the network is configured to supply power to a load. Furthermore, the system includes a controller configured to control when each of the plurality of contacts toggle according to a power state, and the power state includes information regarding a charge of each power unit, a load demand, and a supplied power being supplied by the plurality of power units.

14 Claims, 4 Drawing Sheets

DYNAMIC BATTERY CONTROL BASED ON DEMAND

BACKGROUND OF THE INVENTION

The subject matter disclosed herein relates to power supply banks and power units and, more specifically, to controlling the interconnection of power units according to charge, demand, and/or supply of electrical power.

Power supply banks are used to supply power to various electrical systems or provide auxiliary or emergency power (e.g., uninterruptable power supply) during losses in power. Within the power supply banks, there may be various types of power units, such as batteries, cells of batteries, capacitors, super-capacitors, or other electrical power supplying components. The power units are interconnected within the power supply banks in various arrangements to provide power to a load. In certain situations, the power supply banks may supply power to loads having dynamic demands that change rapidly. When the loads change, power from the power supply banks and/or power units may be wasted within the system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a plurality of power units each configured to supply power. Additionally, the system includes a plurality of contacts each configured to toggle an electrical connection of each of the plurality of power units as a network. Moreover, the network is configured to supply power to a load. Furthermore, the system includes a controller configured to control when each of the plurality of contacts toggle according to a power state, and the power state includes information regarding a charge of each power unit, a load demand, and a supplied power being supplied by the plurality of power units.

In a second embodiment, an apparatus includes supplying power to a load via a network of one or more power units. The method also determining a demand from the load. Additionally, the method includes determining a power state based on the demand. Furthermore, the method includes toggling one or more contacts to couple or decouple a respective power unit in an arrangement based on the power state, and the power state includes information regarding a charge of each power unit, a load demand, and a supplied power being supplied by the plurality of power units.

In a third embodiment, a method includes coupling a network of one or more power units to a load. Additionally, the method includes determining a present charge for at least one of the one or more power units. Furthermore, the method includes toggling the one or more contacts to decouple one or more substantially discharged power units from the network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of, the articles "a," "an," "the," and "said" are intended to mean that there are one or more of the elements. The terms "comprising," "including," and "having" are intended to be inclusive and mean that there may be additional elements other than the listed elements.

Various embodiments include managing one or more power supply banks with a controller. Within each power supply bank are multiple power units, such as batteries, battery cells, capacitors, and/or supercapacitors. The power supply banks provide power to one or more loads. The controller determines the load demand. In some embodiments, the demand may be dynamic, such as loads being additionally powered by a wind farm. The controller determines the power available in the power supply banks and/or power units to arrange the power units in a suitable arrangement, such as a parallel arrangement, series arrangement, a power-saving arrangement, or a reverse polarity arrangement. In certain embodiments, the controller may prioritize the loads according whether the function performed by the load (e.g., fire prevention) is critical to the system (e.g., power plant). In such embodiments, the controller may reserve power for critical loads in case of extended or repeated losses of power (e.g., blackouts or brownouts). Additionally, the power supply banks and/or power units may be recharged in a prioritized order to recharge power supply banks and/or power units that supply critical loads before recharging power supply banks and/or power units that supply non-critical loads.

Figure 1:
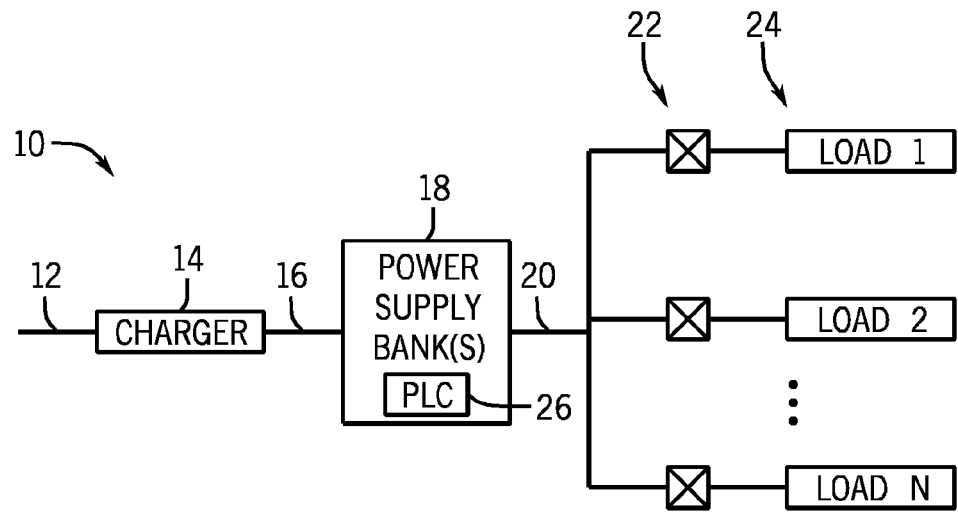
FIG. 1 illustrates an embodiment of a power supply system having a controller located in a power supply bank.

FIG. 1 illustrates an embodiment of a power supply system 10. The power supply system 10 receives a charger power 12 that provides power to a charger 14, which, in turn, may provide a charging power 16 to one or more power supply bank(s) 18. The charger power 12 may be received as power from a generator, power grid, or any other method suitable for power generation in either an alternating current (AC) or direct current (DC) form. The charger 14 may include various types of chargers such as a simple DC charger, trickle charger, pulse charger, inductive charger, another type of suitable charger, or some combination thereof Additionally, if the charger power 12 is delivered as AC, the charger 14 may include a power converter that converts an AC signal to DC suitable to charge the power supply banks 18. Furthermore, the charger 14 may include voltage regulation and filtering components to convert the charger power 12 to a charging power 16 suitable voltage (e.g., 24 V) to charge one or more power supply banks 18. Additionally, within each power supply bank 18, one or more power units are oriented in a dynamic arrangement. The power units may be any power supply component suitable for storing electricity, such as a battery, cell in a battery, multiple batteries, capacitors, supercapacitors (e.g., electric double-layer capacitor), or some combination thereof For example, if a power unit is a battery cell then the power supply bank 18 may be a battery (e.g., voltaic pile).

In certain embodiments, one charger 14 may provide charging power 16 to multiple power supply banks 18, but other embodiments may include multiple chargers 14 connected to each power supply bank 18. Additionally, some embodiments may include multiple chargers 14 interconnected with multiple other power supply banks 18 to essentially create a redundant network of chargers 14 for each of the power supply banks 18, such that power supply system 10 would be capable of compensating for the failure of one charger 14 until the failed charger 14 can be replaced. Furthermore, in certain embodiments, the charger 14 may be configured to only supply charging power 16 to the power supply banks 18 under certain conditions, such as depletion of the power supply banks 18 and/or initiation of a power supply bank recharge by reversing polarity of the power supply banks 18. In other embodiments, the charger 14 may be configured to supply charging power 16 at all times, but the charging power 16 may not be received by at least part of the power supply banks 18 until at least part of the power supply bank 18 is ready to be recharged.

Further, the power supply system 10 includes a supplied power 20, fuses 22, loads 24, and a controller 26. When one or more loads 24 demand power from the power supply banks 18 and the banks are not depleted, the banks 18 may provide supplied power 20 to each load 24 through an overcurrent protection device 22. In certain embodiments, the overcurrent protection devices 22 may be any device suitable for protecting the load 24 from an overcurrent fault, such as a fuse or a circuit breaker. The loads 24 may be any device that may operate using DC power from the power supply banks 18. For example, some embodiments may include DC pumps that control flow of fluids through a power plant. The controller 26 may be a programmable logic controller, a dedicated closed-loop controller, or any controller suitable for controlling power unit arrangements according to power state information. Furthermore, the controller 26 may be powered by the power supply bank 18 or may be powered from an external source whether the external source is dedicated to the controller 26 or the external source supplies power to other devices in addition to supplying power to the controller 26. In certain embodiments, the controller 26 may manage multiple power supply banks 18.

As discussed below, the controller 26 controls the arrangement of power units in the power supply bank according to power state information. To determine the power state information, the controller 26 determines the demand of one or more of the loads 24, the charge of one or more of the power units within one or more power supply banks 18, and the amount of power being currently provided as the supplied power 20. For example, if the supplied power 20 is a lower voltage than the voltage demanded by the load 24, the controller 26 may arrange the power units in series to increase the voltage supplied to the load 24. However, if the current of the supplied power 20 is too low as well, the controller 26 may attempt couple more power units within the power supply bank 18 to increase the current and/or voltage. If the power supply bank 18 is already providing maximum power (e.g., all available power units coupled) and both the current and voltage are lower than the demand, the controller may attempt to couple one or more additional power supply banks 18 to the loads 24. If all available (e.g., non-reserve) power banks 18 and power units are connected, the controller 26 may decouple one or more loads 24 from the power supply bank 18 in a prioritized order to provide a desirable amount of power to high priority loads 24, such as loads that provide cooling or fire prevention. In such embodiments, the lower priority loads 24 may be decoupled from the power supply bank 18 or coupled to lower priority power supply banks or power units.

Figure 2:
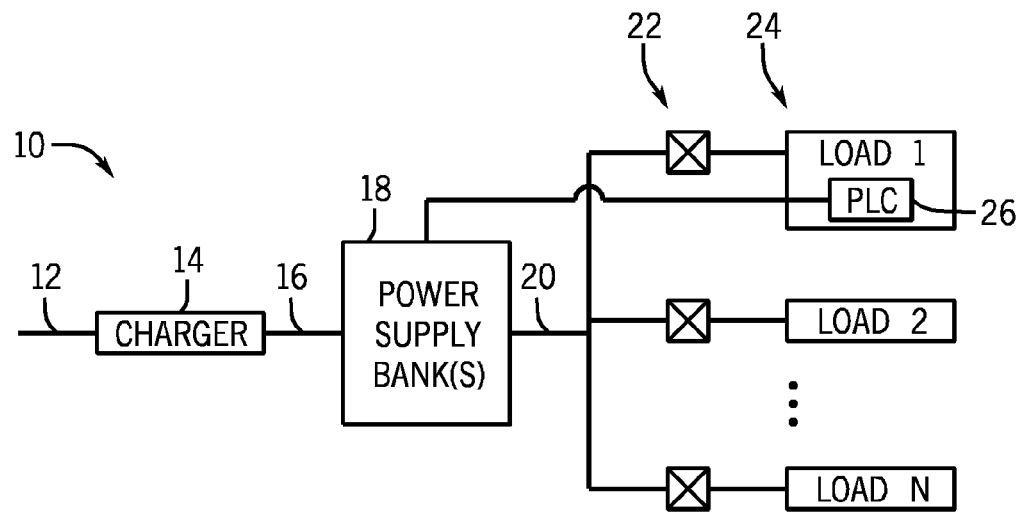
FIG. 2 illustrates an embodiment of a power supply system having a controller located in a load supplied by the power supply system.

As illustrated, the controller 26 may be located within the power supply bank 18, but other embodiments may include alternate locations for the controller 26. For example, FIG. 2 illustrates an embodiment of the power supply system 10 having a controller 26 located in one of the loads 24. Additionally, other embodiments may include a controller 26 that is remote from other components in the power supply system 10, such as in a computer that is physically remote from the power supply bank 18 and the loads 24.

Figure 3:
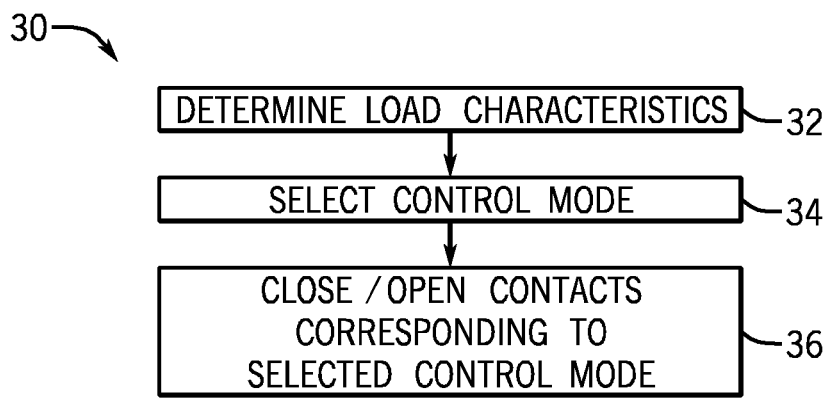
FIG. 3 is a process illustrating an embodiment of a method for controlling the power supply system according to load characteristics.

FIG. 3 illustrates an embodiment of a method 30 for controlling the power supply system 10 according to characteristics of the loads 24. The controller 26 first determines one or more load characteristics from one or more loads 24 (block 32). Since the power supply system 10 may be an auxiliary supply the load characteristics may be eligible until a power loss occurs (e.g., brownout or blackout). The load characteristics may include a voltage demand of load(s) 24, a current demand of load(s) 24, a number of load(s) 24 being supplied, and/or a priority of the loads 24. In some embodiments, the controller may determine multiple load characteristics from each load 24 (e.g., current demand, voltage demand, and/or load priority). In other embodiments, the controller 26 may determine load demands from a high priority load 24, thereby only determining a low priority status of other loads 24 rather than acquiring all load characteristics from the low priority loads 24.

After determining the relevant load characteristics, the controller 26 selects a control mode according the load characteristics compared to the number of power units and/or power supply banks 18 still available in the system and the available power of currently connected power units and/or power supply banks 18 in the current arrangement (block 34). Specifically, the controller 26 determines if the load demand is different than the available power being supplied. Moreover, the controller 26 determines the load demand in relation to both the voltage and current demanded. In certain embodiments, this demand may be calculated by known characteristics of the load 24 in a certain state, such as the current and voltage required to operate cooling DC motors during the spin down of a turbine in a power plant. Additionally, the controller 26 determines whether the voltage demand and current demand are capable of being performed by the current arrangement of the power units and power supply banks 18. As discussed below, if the current arrangement is incapable of providing the load demand, the controller 26 modifies the arrangement of the power units and/or power supply banks 18 to a suitable arrangement.

The controller 26 may determine that the power supply bank 18 is depleted beyond some threshold when the charger 14 is capable of supplying the charging voltage 16. The controller 26 then initiates a reverse polarity state that enables recharging of the power supply bank 18 using charging voltage 16. In certain embodiments, this reverse polarity may be applied to power units sequentially, such that the high priority power units are charged before lower priority power units in case of further need of the power units to power high priority loads 24 during a subsequent loss of power as either a brownout or blackout. With the above in mind, the controller determines a control mode that may include a voltage increase, a current increase, overall power increase, unnecessary power connected, or reverse polarity.

According to the comparison of load characteristics to the available power, the controller 26 closes or open contacts within the power supply bank 18 to either increase the voltage of supplied voltage 20, increase the current of supplied voltage 20, decouple unnecessary power units and/or power supply banks 18, or reverse polarity. As discussed below, when the loads 24 demand a voltage higher than the supplied voltage 20, the controller 26 may toggle contacts within the power supply bank 18 to electrically arrange the power units in a series configuration. When toggling the contacts, the controller 26 may decouple/couple additional power units and/or power supply banks 18 from/to the load 24 to vary the voltage/current according to the load demand. For example, if the controller may increase the voltage to a desired level without connecting all of the power units and/or power supply banks 18 some of the power units and/or power supply banks 18 to the load 24. Additionally, some embodiments of the controller may be configured to receive a manual selection from a user selecting a configuration that includes various orientations (e.g., parallel, series, or a combination thereof), a number of power units to connect, and/or the priority of loads 24 connected to the power supply bank 18.

Figure 4:
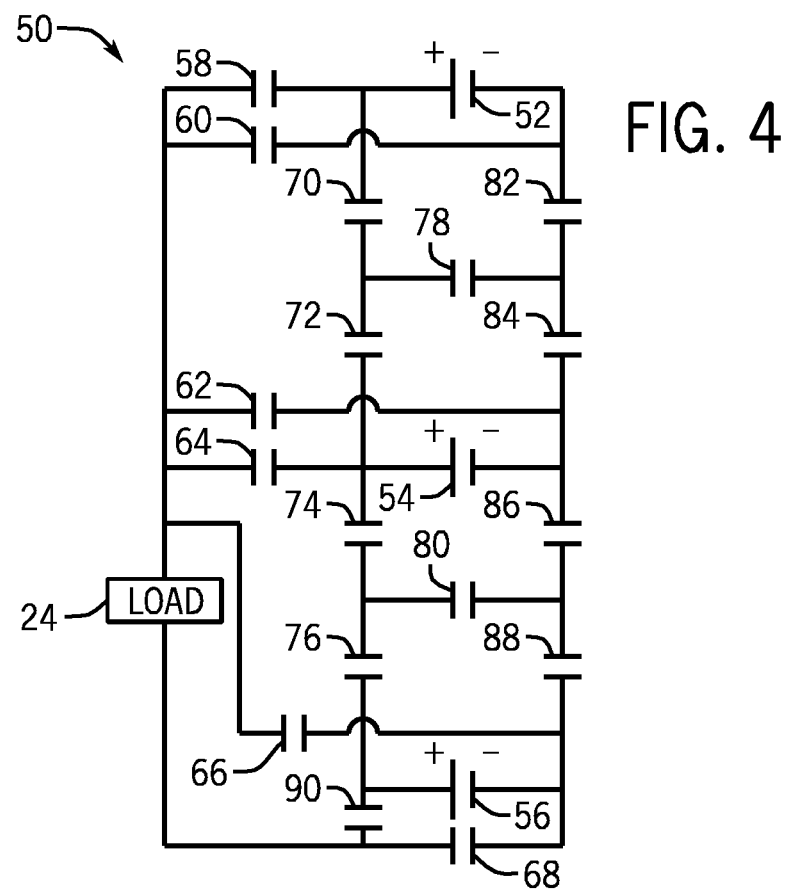
FIG. 4 illustrates an embodiment of a power supply bank with every contact open.

FIG. 4 illustrates an embodiment of a power supply bank 50 with multiple power units 52, 54, and 56 along with multiple open contacts 58, 60, 62, 64, 66, 68, 70, 72, 74, 76, 78, 80, 82, 84, 86, 88, and 90. In certain embodiments, the contacts 58, 60, 62, 64, 66, 68, 70, 72, 74, 76, 78, 80, 82, 84, 86, 88, and 90 may include solid state devices to perform high speed switching, such as power MOSFETs or insulated gate bipolar transistors (IGBT). As can be appreciated, if contacts 58, 60, 70, 82, 62, 64, 74, 86, 66, 90, and 68 are toggled open, the power units 52, 54, and 56 are decoupled from the load 24 as well as each other. Accordingly, the open/closed states of the other contacts may have no substantial effect on the power supply bank 18. Similarly, some embodiments may decouple the power units 52, 54, and 56 from the load 24 by toggling contacts 58, 60, 62, 64, 66, and 66 open. Moreover, the illustrated embodiment only includes one load 24, but other embodiments may include additional loads 24 dynamically coupled to the power supply bank 50 such that the controller 26 may couple or decouple the additional loads 24 to or from the power supply bank 50 according to priority of the loads 24.

In the illustrated embodiment, the power supply bank 50 includes three power units 52, 54, and 56, but other embodiments may include 1, 2, 3, 4, 5, or more power units within the power supply bank 50. As previously discussed, the power units 52, 54, and 56 may be any suitable power supply capable of storing a charge, such as a battery, a battery cell, a battery bank, a capacitor, or a supercapacitor. Additionally, the power units 52, 54, and 56 may provide any voltage for supplying power to the load 24, such as 1.5 V, 9 V, 24 V, 125 V, 240 V or more, or another voltage therein. The voltage of power unit 52 may vary from power unit 54 and 56 or may be equal to each of the other voltages. In other words, the power units in a power supply bank 18 may be of varying voltages. For example, in one embodiment, power unit 52 may be 48 V, and power units 54 and 56 may each be 24 V each that connecting power units 54 and 56 in series provides a voltage equal to that of power unit 52.

As will be appreciated, in the power supply bank 50 with no closed contacts, the power units 52, 54, and 56 are not coupled to any components capable of parasitically draining the power units, thereby maximizing the period over which the power units maintain a charge. In certain embodiments, the electrical decoupling of the power units 52, 54, and 56 from the load 24 when the load 24 has no demand of power from the power supply bank 50. For example, if the power supply bank 50 is part of an auxiliary power supply, it is not desirable to drain power from the power supply bank 50 except in the case of a brownout (e.g., partial loss of power) or blackout (e.g., complete loss of power) from the electrical grid. Because there is no demand from the load 24 in these circumstances, the controller 26 toggles each of the contacts 58, 60, 62, 64, 66, 68, 70, 72, 74, 76, 78, 80, 82, 84, 86, 88, and 90 open to block transmission of any power from the power units 52, 54, and 56.

Figure 5:
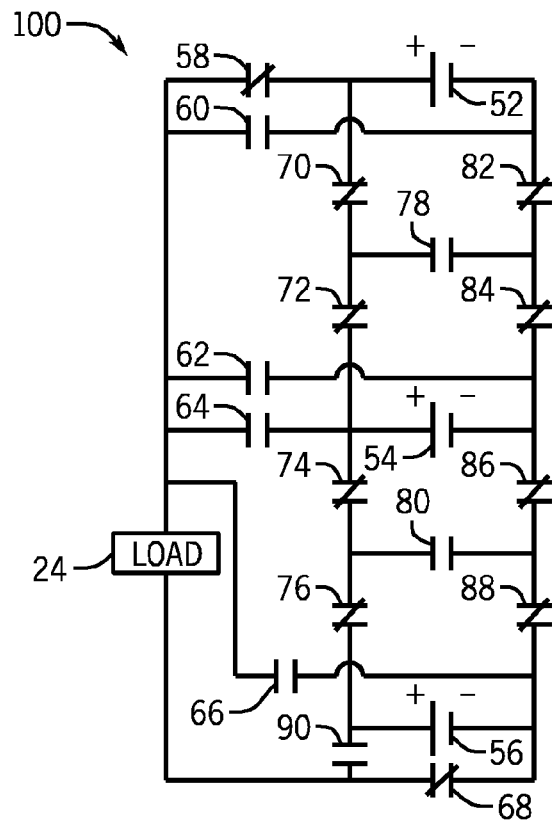
FIG. 5 illustrates an embodiment of a power supply bank with certain contacts closed to connect power units in a parallel arrangement.

FIG. 5 illustrates an embodiment of a power supply bank 100 with contacts 58, 70, 72, 74, 76, 82, 84, 86, and 88 closed to connect the power units 52, 54, and 56 in a parallel arrangement. As can be appreciated, the electrical connection of contacts 58, 70, 72, 74, 76, 82, 84, 86, and 88 enable the power units 52, 54, and 56 to provide more current than is possible using only one or two of the power units. Accordingly, if the controller 26 determines that the load 24 demands additional current at a voltage capable of being supplied by one or more power units, the controller 26 may couple the power units in the parallel illustrated arrangement. Additionally, if the voltage and current demanded by the load 24 may be achieved by using only two of the power units (e.g., power units 54 and 56), one or more power units (e.g., power unit 52) may be decoupled from the load 24 by toggling one or more contacts (e.g., contacts 58, 64, 70, 72, 82, and 84) to remove the superfluous power units. Additionally, if the power units 52, 54, and 56 are incapable of providing the current at a desired voltage, the controller 26 may couple additional power supply bank(s) 18 to the load 24.

Figure 6:
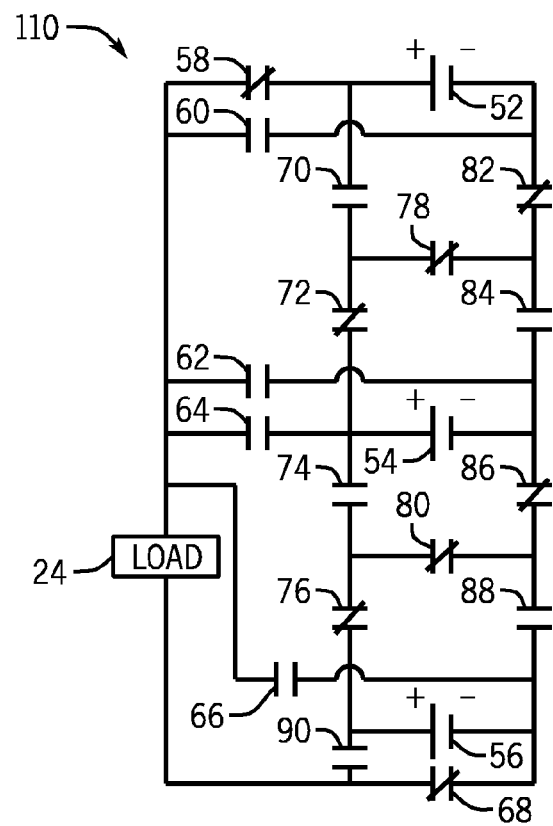
FIG. 6 illustrates an embodiment of a power supply bank with certain contacts closed to connect power units in a series arrangement.

FIG. 6 illustrates an embodiment of a power supply bank 110 with contacts 58, 72, 76, 78, 80, 82, and 86 closed to connect the power units 52, 54, and 56 in a series arrangement. In certain embodiments of the power supply bank 110, the loads 24 may be dynamic (e.g., regeneration of an electric car, power supplied by a wind farm, solar power source, or other renewable energy). With dynamic loads 24, the voltage demand may vary quickly. Accordingly, some embodiments include contacts that may switch quickly (e.g., IGBT) into a series configuration to match the voltage demand. For example, if the load 24 demands a higher voltage than each of the power units 52, 54, and 56 are capable of supplying alone or in parallel, the controller 26 may close contacts 58, 72, 76, 78, 80, 82, and 86 and opening the remaining contacts. As can be appreciated, by coupling the power units 52, 54, and 56 in series, the supplied power 20 has a higher voltage than can be supplied by any of the power units 52, 54, or 56 alone or in a parallel configuration. However, if the power units 52, 54, and 56 are incapable of providing the current at a desired voltage, the controller 26 may attempt to couple additional power supply bank(s) 18 to the load 24.

In various embodiments, when the power supply bank 50 of FIG. 4 is arranged in an open configuration, certain of the contacts 58-90 may be toggled to achieve the parallel connected power supply bank 100 of FIG. 5 or the series connected power supply bank of FIG. 6. For example, when the power supply bank 50 transitions from an open configuration to either a parallel configuration or a series configuration, a shared subset of the contacts may be switched. Specifically, contacts 58, 68, 72, 76, 82, and 86 may be toggled closed regardless of whether a parallel or series configuration is desired. If the power supply bank 50 is to be toggled to a parallel configuration, a parallel subset of contacts corresponding to a parallel configuration (e.g., 70, 74, 84, and 88) may also be toggled to achieve the parallel connected power supply bank 100 of FIG. 5. However, if the power supply bank 50 is to be toggled to a series configuration, a series subset of contacts corresponding to a series configuration (e.g., 78 and 90) may be toggled closed while the parallel subset is toggled open to achieve the series connected power supply bank 100 of FIG. 6.

Figure 7:
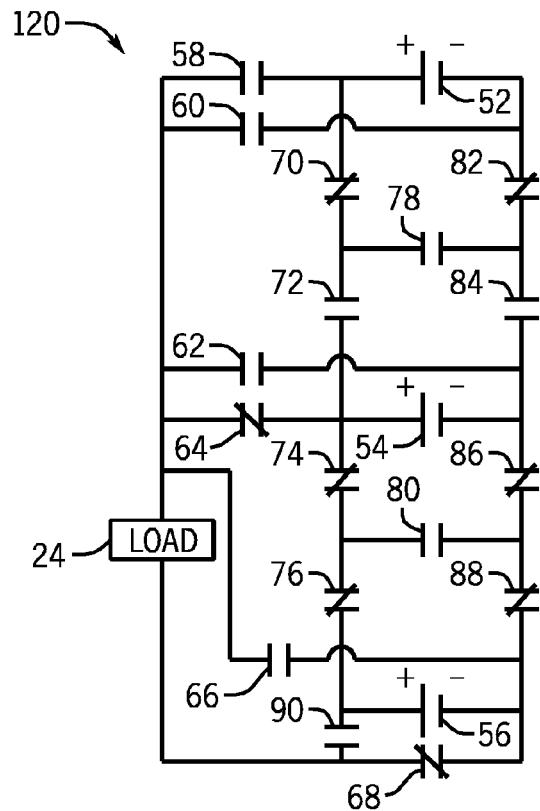
FIG. 7 illustrates an embodiment of a power supply bank with certain contacts open to disconnect a power unit from a network.

FIG. 7 illustrates an embodiment of a power supply bank 120 with contacts 58, 60, 72, and 84 open to disconnect power supply bank 120 and/or one or more power units from the load 24 and a power network 122 to reserve power. In certain embodiments, it may be desirable to reserve power in one or more power units or power supply bank during the operation of the power supply system 10. For example, power unit 52, and/or a power supply bank may be decoupled from the power network 122 to reserve the power in the power unit 52 for a high priority load 24 (e.g., fire prevention). Additionally or alternatively, the power unit 52 may be decoupled from the power network because the demand from load 24 does not exceed power that can be provided by power units 54 and 56.

Since contacts 58, 60, 72, and 84 are toggled open, the power unit 52 is electrically decoupled from the power network 122. Additionally, because contacts 58, 60, 72, and 84 being open effectively decouples the power unit 52, the remainder of the contacts may be toggle open or closed depending upon demand by load 24. As illustrated, contacts 64, 68, 74, 76, 86, and 88 may be closed to couple the power units 54 and 56 to the load 24 in parallel. In other embodiments, the load 24 may demand a higher voltage than can be provided by the illustrated embodiment or power units 54 or 56 alone. Accordingly, such embodiments, may toggle contact 74, 80, and 88 may be toggled closed to couple the power units 54 and 56 in series to the load 24.

Figure 8:
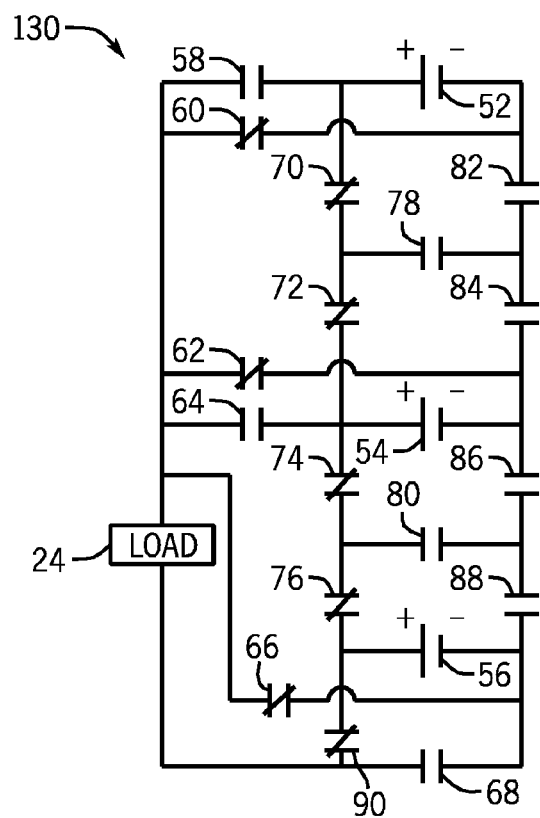
FIG. 8 illustrates an embodiment of a power supply bank with certain contacts closed to connect power units in a reverse polarity arrangement.

FIG. 8 illustrates of an embodiment of a power supply bank 130 with contacts 60, 62, 66, 70, 72, 74, 76, and 90 closed to connect power units 52, 54, and 56 in a reverse polarity arrangement. In certain embodiments, the load 24 may provide power on certain occasions (e.g., regenerative braking in an electric car). Instead of wasting the energy provided by the load 24, the controller 26 reverses polarity of the power supply bank 130 to enable the charging of the power units 52, 54, and 56 using the power provided by the load 24 when the power discharged by the load 24 exceeds the voltage of the power units 52, 54, and 56. Accordingly, in certain embodiments, the controller 26 determines if the load 24 is discharging a higher voltage than the power units 52, 54, and 56 and toggle the respective contacts to the illustrated reverse polarity arrangement to capture the discharged energy, then may toggle the contacts back to the state of operation being used prior to the reversed polarity. Since some embodiments include contacts may as IGBT devices, the switching may occur very efficiently and quickly in these devices to make the regenerative cycle as efficient as possible without substantially wasting electrical power.

Technical effects of the invention include an increase in the efficiency of power supply banks due to matching the power supplied to the load characteristics while factoring the power available in the power units and/or powers supply banks. Accordingly, the controller may connect the minimum number of power units and/or supply banks to the load 24 by alternating the arrangement of the power units (e.g., parallel arrangement). Additionally, by having one controller capable of controlling multiple power supply banks and power units, each of the power supply banks and power units are capable of cross-talk control through the controller rather than simplex communication solely between a power unit and the load 24. The controller may prioritize loads 24 into tiers of criticality for use in a system, such as designating a fire prevention system in a power plant as a critical load 24. Furthermore, the controller may prioritize the power supply banks and/or power units so that power banks and/or power units supplying critical loads 24 may be reserved and/or recharged with a priority to maintain the critical loads 24 during occasions of power loss.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a plurality of power units each configured to supply power;
a network of contacts each configured to toggle an electrical connection, wherein the network is configured to supply power to a load, wherein the network of contacts comprises:
a first plurality of contacts configured to toggle closed when the plurality of power units are to be connected in parallel or series;
a second plurality of contacts configured to toggle closed when the plurality of power units are to be connected in parallel and to toggle open when the plurality of power units are to be connected in series; and
a third plurality of contacts configured to toggle closed when the plurality of power units are to be connected in series and to toggle closed when the plurality of power units are to be connected in parallel; and
a controller configured to control when each of the plurality of contacts toggle open or closed based at least in part on a determined demand for the load, a charge of each of the plurality of power units, and a power supplied by the plurality of power units, and wherein the controller is configured to toggle a fourth plurality of contacts to arrange the plurality of power units to reverse polarity with respect to the load to enable recharging of at least one of the plurality of power units.

2. The system of claim 1, wherein the plurality of power units comprises a plurality of batteries.

3. The system of claim 1, wherein the plurality of power units comprises a plurality of cells located within one or more batteries.

4. The system of claim 1, wherein the controller is configured to toggle the first and second pluralities of contacts to arrange the plurality of power units in parallel according to a power state, wherein the power state comprises information regarding a charge of each power unit, a load demand, or a supplied power being supplied by the plurality of power units.

5. The system of claim 1, wherein the controller is configured to toggle the first and third plurality of contacts to arrange the plurality of power units in series according to a power state, wherein the power state comprises information regarding a charge of each power unit, a load demand, and a supplied power being supplied by the plurality of power units.

6. The system of claim 1, wherein the controller is configured to toggle at least one of the first, second, or third pluralities of contacts to decouple at least one of the one or more power units from the network based on a charge state for the at least one power unit.

7. The system of claim 1, wherein the controller is configured to toggle the fourth plurality of contacts to orient the plurality of power units in a recharging connection based upon a power state.

8. The system of claim 7, wherein the controller is configured to toggle the fourth plurality of contacts to orient the plurality of power units in a recharging connection during a regenerative braking cycle.

9. The system of claim 1, wherein each contact of the network of contacts comprises a solid state device.

10. The system of claim 1, wherein each contact of the network of contacts comprises an insulated gate bipolar transistor.

11. The system of claim 1, comprising a dynamic power system for which the controller provides backup power when power generation by the dynamic power system is relatively low compared to the load demand.

12. The system of claim 1, wherein the controller is configured to provide power to a load based on priority of a function performed by the load.

13. The system of claim 1, wherein the load comprises a critical load to a power generation system.

14. The system of claim 13, wherein the load comprises a fire prevention system of the power generation system, and the power generation system comprises a power plant.

\* \* \* \* \*